United States Patent

Moore et al.

[11] Patent Number: 6,068,759
[45] Date of Patent: May 30, 2000

[54] PROCESS FOR RECOVERING LUBE OIL BASE STOCKS FROM USED MOTOR OIL FORMULATIONS, ASPHALT BLEND COMPOSITIONS CONTAINING USED MOTOR OIL BOTTOMS FROM SAID PROCESS, AND ASPHALT PAVEMENT COMPOSITIONS CONTAINING SAID ASPHALT BLEND COMPOSITIONS

[75] Inventors: Howard F Moore, Catlettsburg; Donald P Malone, Grayson; Patricia K Doolin, Ashland, all of Ky.; David J Zalewski, Proctorville, Ohio

[73] Assignee: Marathon Ashland Petroleum LLC

[21] Appl. No.: 09/026,367

[22] Filed: Feb. 19, 1998

[51] Int. Cl.⁷ .................................................. C10M 175/00
[52] U.S. Cl. ...................... 208/179; 208/188; 208/251 R
[58] Field of Search ................................... 208/177, 179, 208/188; 210/708

[56] References Cited

U.S. PATENT DOCUMENTS

| | | | |
|---|---|---|---|
| 4,101,414 | 7/1978 | Kim et al. | 208/18 |
| 4,432,865 | 2/1984 | Norman | 208/181 |
| 4,938,876 | 7/1990 | Ohsol | 208/188 |
| 5,244,565 | 9/1993 | Lankton et al. | 208/92 |
| 5,302,282 | 4/1994 | Kalnes et al. | 208/179 |
| 5,447,628 | 9/1995 | Harrison et al. | 208/184 |

*Primary Examiner*—Helane Myers
*Attorney, Agent, or Firm*—Laurence P. Hobbes; Richard D. Stone

[57] ABSTRACT

A process is provided for recovering lube oil base stocks from used lubricating oil formulations containing base oil stock and organo-metallic component which obviates pre-separation of water and light hydrocarbons contaminants. The process comprises directly contacting used lubricating oil with a heated vapor, e.g., steam, under conditions which at least partially decompose the organo-metallic component and provide a desired volume of pumpable bottoms containing organo-metallic compound decomposition products and an overhead comprising gases and distillatable hydrocarbons, with no substantial carryover of metals into the overhead. The process may be carried out under conditions which minimize decomposition of high molecular weight additives such as VI improvers, to provide a bottoms fraction which may be added to asphalt or fuel oil. Also disclosed are an asphalt blend composition containing an asphalt component and the bottoms of the above process, and a pavement composition comprising aggregate and the asphalt blend composition.

12 Claims, 1 Drawing Sheet

PROCESS FOR RECOVERING LUBE OIL BASE STOCKS FROM USED MOTOR OIL FORMULATIONS, ASPHALT BLEND COMPOSITIONS CONTAINING USED MOTOR OIL BOTTOMS FROM SAID PROCESS, AND ASPHALT PAVEMENT COMPOSITIONS CONTAINING SAID ASPHALT BLEND COMPOSITIONS

BACKGROUND OF THE INVENTION

This invention relates to a process for recovering lube oil base stocks from used motor oil formulations. In particular, this invention relates to the removal of metallic additive packages from the waste oil to facilitate further processing of the used motor oil. The invention further relates to asphalt blend compositions containing used motor oil bottoms from the process, and asphalt pavement compositions containing the asphalt blend compositions.

Automotive lubricating oils are usually formulated from paraffin based petroleum distillate oils or from synthetic base lubricating oils. Lubricating oils are combined with additives such as soaps, extreme pressure (E.P.) agents, viscosity index (V.I.) improvers, antifoamants, rust inhibitors, antiwear agents, antioxidants, and polymeric dispersants to produce an engine lubricating oil of SAE 5 to SAE 60 viscosity.

After use, this oil is collected from truck and bus fleets, automobile service stations, and municipal recycling centers for reclaiming. This collected oil contains organo-metallic additives such as zinc dialkylthiophosphate from the original lubricating oil formulation, sludge formed in the engine, and water. The used oil may also contain contaminants such as waste grease, brake fluid, transmission oil, transformer oil, railroad lubricant, crude oil, antifreeze, dry cleaning fluid, degreasing solvents such as trichloroethylene, edible fats and oils, mineral acids, soot, earth and waste of unknown origin.

Reclaiming of waste oil is largely carried out by small processors using various processes tailored to the available waste oil, product demands, and local environmental considerations. Such processes at a minimum include chemical demetallizing or distillation. The presence of organo-metallics in waste oils such as zinc dialkylthiophosphate results in waste oils becoming sticky, overly viscous and thus difficult if not impossible to process. Moreover, the resulting sludge created reduces the amount of salable product, as well as creating additional disposal problems.

Successful reclaiming processes require the reduction of the organo-metallics (or ash) content to a level at which the hot oil does not become sticky. Such reduction can be carried out by chemical processes which include reacting cation phosphate or cation sulfate with the chemically bonded metal to form metallic phosphate or metallic sulfate. U.S. Pat. No. 4,432,865 to Norman, the contents of which are incorporated herein by reference, discloses contacting used motor oil with polyfunctional mineral acid and polyhydroxy compound to react with undesired contaminants to form easily removable reaction products. These chemical processes suffer from attendant disposal problems depending on the metal by-products formed.

Ash content can also be reduced by heating the used lubricating oil to decompose the organo-metallic additives. However, indirect heat exchange surfaces cannot be maintained above 400° F. (204° C.) for extended periods without extensive fouling and deposition of metals from the additives. Used lubricating oils can be heated to an additive decomposition temperature of 400° F. (204° C.) to 1000° F. (538° C.) by direct heat exchange by mixing with a heated product oil as disclosed in U.S. Pat. No. 5,447,628 to Harrison, et al., the contents of which are incorporated herein by reference. However, dilution of the product oil with used oil obviously suffers from the inefficiency of reprocessing already processed product oil, as well as rapid fouling of reactor surfaces. U.S. Pat. No. 4,101,414 to Kim, et al., incorporated herein by reference, discloses predistillation by steam stripping for several hours of a used lubricating oil stock in order to remove light oil, residual water, sulfur, and $NO_x$. The temperature is kept at temperatures which avoid additive breakdown, and the process provides a concentrate product upon vacuum distillation. Flow processes using heat exchange by direct contact with hot hydrogen have been proposed but are expensive in view of the costs associated with hydrogen compression and hydrogen's low heat capacity. Such processes include UOP's Hy-Lube described in U.S. Pat. Nos. 5,244,565 and 5,302,282 which feature an initial used oil feed fractionation step to remove sludge and a majority of metals utilizing a hot circulating hydrogen stream as a heating medium to avoid deposition of decomposed organo-metallic compounds on heating surfaces, followed by a hydrotreating circuit with caustic neutralization to eliminate chlorides, with a final product fractionation step. Flow processes utilizing steam have also been proposed. However, even when used motor oil is directly heated, i.e., in the absence of heat transfer surfaces, the nozzles and downstream piping can plug in 24 to 72 hours due to the presence of organo-metallic compounds.

It would be advantageous to provide an efficient method for demetallizing used motor oil by thermal treatment using direct heat exchange in a process which does not require apparatus susceptible to clogging or fouling under the conditions encountered during decomposition of metallic additives. It would also be advantageous to provide a process for treating used motor oil which does not require preseparation of light materials or water found in used motor oil as collected.

SUMMARY OF THE INVENTION

The present invention is a process for recovering lube oil base stocks from used lubricating oil formulations containing base oil stock and organo-metallic component which comprises:

i) directly contacting said used lubricating oil with a heated vapor selected from the group consisting of methane, ethane, propane, and steam, under temperature, contact times, and superficial velocity conditions sufficient to at least partially decompose said organo-metallic component and provide a desired volume of pumpable bottoms and vaporized overhead comprising gases and distillatable hydrocarbons with no substantial carryover of metals into the overhead;

ii) condensing said overhead in at least one stage;

iii) recovering at least part of said overhead as distillate; and iv) recovering a bottoms fraction containing organo-metallic compound decomposition products.

No substantial carryover of metals means that the overhead contains no greater than 100 ppm, preferably no greater than 50 ppm metals content. In contrast, the feed can contain from 3000 to 5000 ppm metals. Metals content includes all metals present including organo-metallic compounds, partially decomposed organo-metallic compounds, and completely decomposed organo-metallic compounds.

Said contacting can be carried out as a batch process in a vessel charged with said used lubricating oil or alternatively, as a continuous process wherein said contacting of said used lubricating oil with a heated vapor occurs in a flow mixing means, e.g., a nozzle.

In a preferred embodiment, the present invention can be carried out as a batch process using a plurality of vessels in parallel by v) optionally charging at least one additional vessel with said used lubricating oil before, during, and/or after said vaporization in step i) to provide an additional source of overhead to said condensing step ii).

The flow of overhead from step v) can be controlled so as to provide a flow of overhead to step ii), e.g., during charging of the vessel with used lubricating oil, step iii) and/or step iv), which flow preferably can be essentially continuous. Two, three, or more vessels may be employed in parallel in order to smooth out the flow of overhead to the condensation step and hot vapor from the heater. In general, the longer the time required by charging the vessel and step i)'s heating, the greater the need for plural vessels. The time required may be so great that the use of two vessels in parallel may still not suffice to provide a continuous flow of overhead to the condensation step, indicating the use of three or even more vessels.

By the term vapor is meant a material in gaseous form as introduced into the present process. This would include those materials which can be in a non-gaseous form at room temperature, e.g., $H_2O$ (steam). The heated vapor employed in the present invention is selected from the group of gases/vapors consisting of methane, ethane, propane, and steam. The heated vapor is introduced in the vessel at temperatures ranging from 450 to 1800° F., preferably from 700 to 1100° F., at a rate of 0.1 to 10 pounds/pound of charge, preferably 2 to 3 pounds/pound of charge. Superficial velocities are low enough to prevent entrainment of organo-metallic compounds in the overhead, generally no greater than 5.5 feet per second, preferably no greater than 3 feet per second. Vaporization temperatures achieved in the vessel can range from 400 to 1000° F., preferably 550 to 650° F. The used lubricating oil is contacted with the heated vapor for a period ranging from 0.1 to 2 hours, e.g., 1 hour, preferably 0.25 to 0.5 hours. The vaporization temperatures, steam rates, superficial velocities and contact times are adjusted to provide a preset volume reduction of the total amount of used lubricating oil added to the vessel (or degree of lift of overhead vapors), e.g., ranging from 20 to 95 wt. %, preferably from 60 to 90 wt. % of the total amount of used lubricating oil added to the vessel.

In one embodiment of the present invention, the heated vapor is recovered from the overhead and recycled to step i). This is especially useful where the heated vapor is selected from the group consisting of methane, ethane, and propane.

The above conditions may be varied to adjust the extent of decomposition of the organo-metallic component made up of organo-metallic compounds in the used lubricating oil. Used lubricating oils processed by the present invention may contain organo-metallic compounds in a concentration of 0.01 to 5.0 wt. %. The treatment of the present invention decomposes the organo-metallic component to an extent sufficient to provide a product having an organo-metallic component concentration of 0.005 wt. % or less, preferably less than 0.001 wt. %.

In an especially preferred embodiment, the heated vapor employed is superheated steam. The fouling of used motor oil-contacted surfaces ordinarily observed during UMO processing does not occur in this embodiment. The use of steam may lower partial pressure of the vaporization of the overhead so that vaporization temperatures no greater than 650° F. or even 600° F. can be used. Such lower vaporization temperatures combined with lower contact times may be particularly desirable inasmuch as they may minimize the decomposition of valuable additives of the used lubricating oils, such as viscosity index improvers, pour point depressants, defoamants, and detergent-dispersants, which can be present in used lubricating oils in amounts of at least 0.1 wt. %, e.g., ranging from 0.1 to 25 wt. %, preferably 1 to 10 wt.%.

The presence of these high molecular weight polymer additives in the pumpable bottoms fraction can be especially advantageous when the bottoms are added to such products as performance graded asphalts. Alternatively, the pumpable bottoms can be combined with fuel oil; however, the additives thus introduced confer less benefit than in asphalt.

In another preferred embodiment of the invention, the used lubricating oils contain at least 0.1 wt. %, preferably at least 1 wt. % of viscosity index improver, and said vaporization temperatures and contact times are such as to minimize decomposition of said viscosity index improver so as to provide a bottoms fraction containing organo-metallic compound decomposition products and at least 0.1 wt. %, preferably at least 1 wt. %, viscosity index improver.

In another aspect, the invention relates to a novel asphalt blend composition containing, an asphalt component and the used motor oil bottoms product prepared by the process of the present invention, with or without modification additives such as polymers, chemical gellants, and antioxidants and to paving compositions containing such modified asphalts. Generally, the asphalt blend compositions comprise (a) about 0.1 to about 20 wt.%, preferably about 0.5 wt. % to about 15 wt. % of used motor oil bottoms prepared by the process of the present invention, (b) about 0 to about 20 wt. %, preferably about 0 to about 10 wt. % of a polymer modifier, (c) about 0 to about 7 wt. %, preferably about 0 to about 5 wt. % of a chemical gellant and (d) at least about 80 wt. %, e.g., about 80 wt. % to about 99 wt. %, say, 90 wt. %, of an asphalt component obtained from conventional vacuum distillation, atmospheric distillation, solvent refining, e.g., solvent deasphalting bottoms, or naturally occurring mineral sources, e.g., Trinidad Lake asphalt. All percents herein are by weight of total composition. Asphalt paving compositions of such blend can exhibit a distinct improvement in low temperature properties, in their resistance to thermal cracking and fatigue as defined by the use of the new Superpave Performance Graded (PG) Asphalt Binder Specifications: AASHTO MP1.

In yet another aspect, the present invention relates to a pavement composition comprising aggregate and from about 1–10 wt.% of an asphalt blend containing at least about 80 wt.% of asphalt and from about 0.5–15 wt. % of the bottoms fraction of prepared by the process of the present invention.

BRIEF DESCRIPTION OF THE DRAWINGS

The drawing is a schematic flow diagram illustrating a preferred embodiment of the process of the present invention for reclaiming used lubricating oil.

DESCRIPTION OF THE PREFERRED EMBODIMENTS PROCESS

Figure 1:
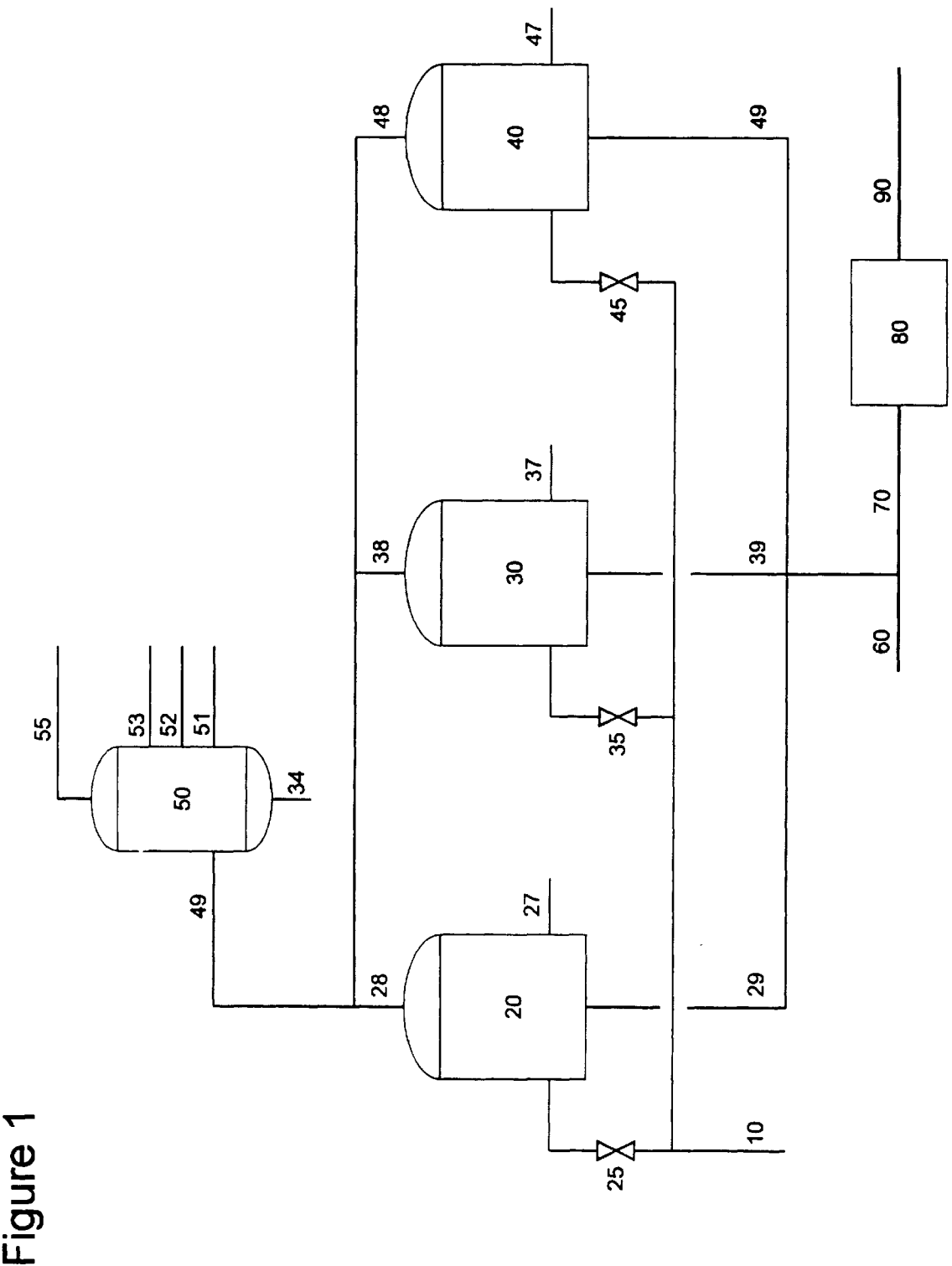

Further features and advantages of the present invention will become apparent to those skilled in the art from the description of the preferred embodiment herein set forth.

The used lubricating oil that can be treated in accordance with the present invention includes used crankcase oil from motor vehicles such as, for example, cars, trucks and railroad locomotives, as well as automatic transmission fluids and other functional fluids in which the major constituent is an oil of lubricating viscosity. Unavoidably, used lubricating oil often contains amounts of water and other hydrocarbon liquids, e.g., light hydrocarbons having a boiling point of less than 600° F., e.g., less than 210° F. The present invention is especially advantageous inasmuch as no pre-separation of water and light hydrocarbons liquids is necessary.

Included within the group of used lubricating oils suitable for treatment herein are used motor oils having mineral lubricating oils such as liquid petroleum oils and solvent-treated or acid-treated mineral lubricating oils of the paraffinic, naphthenic or mixed paraffinic-naphthenic types as the base oil. Oils of lubricating viscosity derived from coal or shale oil can also be included as the base oil of such used motor oils. This group also includes used motor oils having as the base oil synthetic lubricating oils including hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof, alkylbenzenes (e.g., dodecylbenzenes, tetradecylbenzenes, dinonylbenzenes, di(2-ethylhexyl) benzenes, etc.): polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils that can be the base oil of the used lubricating oils treated in the present invention. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diethyl ether of polyethylene glycol having a molecular weight of 500–1000, diethyl ether of polypropylene glycol having an average molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils that can be the base oil of the used lubricating oils treated by the present invention comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyladipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils that the used lubricating oils to be treated can be derived from include $C_5$–$C_{12}$ mono-carboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another class of synthetic oils that can be the base oil of the used lubricating oils that can be treated (e.g., tetraethyl silicate, tetraisopropyl silicate, tetra-(2-ethylhexyl) silicate, tetra-(4methyl-2-ethylhexyl) silicate, tetra-(p-tert-butylphenyl)silicate, hexa(4-methyl-2-pentoxy)-disiloxane, poly(methyl)siloxanes, poly (methylphenyl)siloxanes, etc.). Other synthetic oils include liquid esters of phosphorus-containing acids (e.g., tricresyl phosphate, trioctyl phosphate, diethyl ester of decylphosphonic acid, etc.), polymeric tetrahydrofurans and the like.

The term "lubricating oil" when used herein does not limit the utility of the oil to lubricating, but is merely a description of a property thereof, namely, that the oil is of lubricating viscosity.

The foregoing used lubricating oils usually contain one or more of various additives such as, for example, oxidation inhibitors (i.e., barium, calcium and zinc alkyl thiophosphates, di-t-butyl-p-cresol, etc.), anti-wear agents (i.e., organic lead compounds such as lead diorganophophorodithioates, zinc dialkyldithiophosphates, etc.), dispersants, (i.e., calcium and barium sulfonates and phenoxides, etc.), rust inhibitors (i.e., calcium and sodium sulfonates, etc.), viscosity index improvers, (i.e., polyisobutylenes, polyalkylstyrene, etc.), and detergents (i.e., calcium and barium salts of alkyl and benzene sulfonic acids and ashless type detergents such as alkyl-substituted succinimides, etc.). Additionally, the used lubricating oils treated in accordance with the present invention usually contain various contaminants resulting from incomplete fuel combustion as well as water and gasoline. The process of the present invention is particularly suitable for removing or reducing to acceptable levels (e.g., to permit subsequent hydrogenation without poisoning the hydrogenation catalyst) the above-indicated nitrogen-containing materials and metal-containing materials.

The process of the present invention is preferably carried out in a vessel stirred by the action of the impinging velocity of the heated vapor being introduced therein. The vessel can be entirely conventional in design and construction. The size, design and construction of such vessel is dependent upon the volume of used lubricating oil to be processed. In one embodiment, steam enters at the bottom of the vessel, vapor exits at the top of the vessel, and the residue is drained from the bottom of the vessel. No internal components are necessary.

Asphalt Blend Compositions Containing Used Motor Oil Bottoms

Asphalt Component

Any suitable asphalt or asphalt cement may be employed for producing the modified asphalt blend compositions of the invention. For example, industrial asphalts used for coatings, sealants, roofing materials, adhesives, and other applications may be used. Paving grade asphalt compositions, however, are employed in the preferred embodiment of the invention. Asphalt compositions may be derived, as indicated, from any well known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydrorefining operations. A preferred asphalt is the vacuum tower bottoms that is produced during the refining of synthetic or petroleum crude oils. As indicated, for paving applications, any suitable paving grade asphalt may be employed for the compositions of the invention. Such paving grade asphalt compositions are often referred to as viscosity, penetration graded, or performance graded (PG) asphalts having penetrations up to 400 as measured by ASTM method D5. Preferred asphalts are the performance graded asphalts such as PG 46-40, PG 46-34, PG 46-28, PG 52-40, PG 52-34, PG 52-28, PG 52-22, PG 58-40, PG 58-34, PG 58-28, PG 58-22, PG 64-40, PG 64-34, PG 64-28, PG 64-22, PG 70-40, PG 70-34, PG 70-28, PG 70-22, PG 76-40, PG 76-34, PG 76-28, PG 76-22, PG 82-34, PG 82-28, or PG 82-22. The PG in the title refers to Performance Graded, the first numeric designation refers to the binder's high temperature rutting or deformation resistance temperature range limit, and the last numeric designation refers to the binder's low temperature thermal cracking resistance temperature limit. Complete specification requirements are outlined in specifications under AASHTO MP-1-93 Performance Graded Asphalt Binder Specification. AASHTO is the designation for the American Association of State and Highway Transportation Officials.

The asphalt blend compositions of asphalt component and the used motor oil bottoms of the present invention also exhibit improved low temperature performance properties without excessive sacrifice of high temperature PG grade performance, e.g., rutting resistance.

Polymer Modifiers

The polymers used for the present asphalt blends are well-known to those skilled in the art and comprise: Styrene Butadiene (SB) diblock polymers, Styrene-Butadiene-Styrene (SBS) triblock polymers which may be either linear or radial, styrene-isoprene-styrene (SIS) diblocked polymers, hydrotreated SBS, Styrene Ethylene Butadiene Styrene polymers (SEBS), Styrene Butadiene Rubber (SBR), polyacrylamide, e.g., those described in U.S. Pat. No. 4,393,155 to Garrett, Glycidyl-containing ethylene copolymers in U.S. Pat. No. 5,331,028, or Crumb Rubbers.

Gellants

Similarly, the gellants which can be added to the present asphalt blends are not narrowly critical and can include: chemical gellants such as metallic soaps formed by the neutralization of fatty acids and/or rosin acids; organoclays, e.g., bentonites, kaolin clays, etc.; hydrogenated castor oils; oligomers; siloxanes; or others well-known to those skilled in the art or included in the patent or other literature.

Antioxidants

Though not narrowly critical, preferred antioxidants are an oxidation inhibiting or stabilizing amount of a composition selected from metal hydrocarbyl dithiophosphates, and mixtures thereof, and a composition selected from antioxidant butylated phenols, and mixtures thereof, in a specified ratio to each other, as described more fully hereinafter. Preferably, the components are added to the oxidized blend of asphalt and fluxing component so that the resulting product comprises from about 0.1 wt. % to about 5.0 wt. % of a composition selected from metal hydrocarbyldithiophosphates, and mixtures thereof, and from about 0. 1 wt. % to about 5.0 wt. % of a composition selected from antioxidant butylated phenols, and mixtures thereof, in a specified ratio to each other, as described more fully hereinafter. Most preferably, metal hydrocarbyl dithiophosphate component employed is a mixture of such dithiophosphates, and the metal hydrocarbyl dithiophosphate component is supplied in an amount of from about 0.1 wt. % to about 2.0 wt. %. The antioxidant butylated phenol is preferably supplied in a range of from about 0.1 wt. % to about 2.0 wt. %.

Hydrocarbon Solvents

The hydrocarbon solvents can be any which are capable of reducing the viscosity of the asphalt blend composition. Preferred solvents include: mineral spirits, naphthas, kerosenes, and fuel oils.

Emulsifiers

The emulsifiers include anionic or cationic or nonionic emulsifiers. Those particularly preferred are those described in U.S. Pat. No. 4,393,155 to Garrett, the contents of which are incorporated herein by reference.

Process Description

Referring to the drawing, raw, used lubricating oil containing 1–10 wt. % organo-metallic compounds, 0–10 wt. % water, 0–5 wt. % light hydrocarbons having a boiling point below 300° F., and 0–5 wt. % viscosity index improvers, which has not been pretreated to remove water and lower boiling point liquids is passed through line 10 to plural vessels 20, 30, and 40 which are controlled by valves 25, 35, and 45, respectively. Each vessel is capable of holding about 10 to 1000 gallons, preferably 100 to 500 gallons of used lubricating oil. Steam superheated to a temperature of 700 to 1600° F., is introduced into the vessels through lines 27, 37, and 47, respectively, at a rate of 1 to 3 pounds/pound of charge, in order to heat the oil to a temperature of 650° F. by direct contact. The required contact time for the oil is dependent on the concentration of organo-metallic compounds in the used oil, the desired extent of decomposition of the organo-metallic compounds and the desired volume reduction and degree of lift. Steam rate is adjusted to avoid entrainment of organo-metallic compounds into the overhead fraction which contains water, light hydrocarbons, and distillatable oil. The overhead fraction is passed through lines 28, 38, and 48, into line 49 which passes into a vacuum distillation column 50 wherein lighter hydrocarbons (suited to use as fuel gas after separation) and water are taken off as overhead through line 55. The distillate oil may be recovered as a single product but is typically fractionated to produce a number of distillate fractions which have the boiling range of the final lubricating oil product desired. Different fractions of lubricating oil are taken off the column at 51, 52, and 53, and collected. The initial boiling point of the distillate fraction is 70° F., and the end point is 1100° F. The collected distillate may be further treated by catalytic hydrogenation or clay treatment (not shown) to reduce sulfur content, improve color, saturate olefins and thereby increase stability and reduce gum forming compounds. The vacuum bottoms are taken off at 54 and may be used as fuel oil, asphalt extender, feedstock for delayed coking, feedstock for partial oxidation or a gasifier or for cement kiln fuel where the metal would remain in the product cement. The bottoms fraction from the vessels are removed from lines 29, 39, and 49, respectively and are directed through line 60 for addition to fuel oil or, alternatively, directed through line 70 for mixing with asphalt in asphalt mixing means 80, the asphalt being directed through line 90.

The above can be carried out using 1 or more vessels. Where a single vessel is used, there is an interruption of overhead to the vacuum distillation column during heating up of the used motor oil, and during the removal of the bottoms fraction. In a preferred embodiment, use of the column is optimized by having one or more additional vessels operated in parallel so as to provide a constant or near constant source of overhead to the column.

By way of further illustration of the process of the present invention, reference may be made to the following example. Unless otherwise indicated, all parts and percentages are by weight.

EXAMPLE 1

Batch Process 2002 g of a raw used motor oil containing emulsified water were charged to a 30 inch tall batch vessel of 4 inch nominal diameter (externally heated by a temperature controlled heat tape to cancel heat losses). Superheated steam (1030–1050° F.) was injected through a ball valve directly into the bottom of the liquid used motor oil bath at an average steam flow of 1109 grams per hour. The test was run for 3.08 hours to a final temperature of 600° F., the overhead vapors (oil and water) were condensed in two series product condensers, and the oil products analyzed. Residual pot materials were also removed and analyzed after cooling. Results are set out in Table 1 below.

TABLE 1

| Products: | Composite Overhead | Bottoms |
| --- | --- | --- |
| Collected, g | 1483 | 556 |
| °API | 28.1 | 19.0 |
| Elemental Analyses(wt. %) | 74.1 | 27.8 |
| Raw Yield | | |
| Mg | <.01 | 0.19 |
| P | .003 | 0.38 |
| S | 0.13 | 0.90 |
| Cl | 0.016 | 0.008 |
| Ca | 0.001 | 0.48 |
| Fe | 0.003 | 0.08 |
| Zn | 0.001 | 0.51 |
| Pb | — | 0.03 |

The results indicated that oil was successfully separated from additive metals, i.e., essentially no additive metal carryover occurred. A bottoms yield of about 28 wt. % was obtained and the bottoms were fluid. No process fouling of any type was observed. The bottoms product had no odor at room temperature, and at 400° F. exhibited only a faint hydrocarbon smell similar to hot asphalt, unlike conventionally prepared used motor oil bottoms made by processes using indirect heat exchange, which exhibit a strong burned odor.

EXAMPLE 2

Continuous Process

Used motor oil near ambient temperature was mixed rapidly in an atomizer with superheated steam to vaporize 70% to 80% of the oil. The residue separated from the steam-oil vapor mixture and flowed to a residue accumulator. The steam-oil mixture was cooled first to 225° F., where most of the oil and little steam condensed. The heavy oil condensate separated from the remaining steam-oil vapor in an accumulator. The remaining steam-oil mixture which was nearly all steam was condensed and collected in a water condensate accumulator. The process avoided indirect heat tranfer while ensuring that the highest temperature the oil reached was the atomizer outlet temperature. The atomized oil was cooled quickly so residence time at atomizer temperature is short. Steam stripping allowed a lower flash temperature for a given amount of used motor oil vaporization compared to atmospheric or even moderate subatmospheric flash vaporization. An equal weight of steam to used motor oil charge is equivalent to moderate vacuum flashing because the molecular weight of steam is 10 to 30 times less than that of used motor oil.

EXAMPLE 3

Asphalt Containing Used Motor Oil Bottoms Additive

Merey crude was distilled to cut temperatures of 825° F. and 850° F. to produce light and heavy bottom fractions possessing viscosities of 1779 and 2738 poise at 140° F. The heavier fraction was cut back with used motor oil residue to produce binders with viscosities similar to the lighter cut.

Used motor oil bottoms produced by the batch steam process of the present invention using a lift rate of 86% provided a material having an API gravity of 13.4, and an elemental analysis (wt.%) of 0.26 Mg, 0.52 P, 0.73 Ca, 0.70 Zn, 1.13 S, 0.01 Cl, 0.11 Fe, and 0.04 Pb. Viscosities measured at 60° C. and 100° C. were 7472 and 831 centistokes (cSt), respectively, and were similar to oils possessing a viscosity index of 200, suggesting that at least some of the viscosity improvers in the used motor oil remain intact during processing. The bottoms of the invention contained 10.7 wt. % heptane insolubles (compared to 21.7 wt. % for a commercially available used motor oil bottoms product) which suggests less degradation of additives during processing. High pressure liquid chromatography analysis of the used motor oil bottoms showed 52.3 wt. % saturates, 10.7 wt.% monoaromatics, 3.2 wt. % diaromatics, 2.5 wt. % 3-ring aromatics, 4.2 wt. % 4-ring aromatics, and 16.4 wt.% polars.

Mixing the above used motor oil bottoms with the above Merey crude produced an asphalt blend comprising 11 wt. % used motor oil bottoms. The Strategic Highway Research Program (SHRP) properties of the Merey Crude and asphalt blend (11% used motor oil bottoms) are set out below in Table 2.

TABLE 2

| | Viscosity @140° F. | SHRP Grade (° C.) | Actual Grade (° C.) | Useful Temperature Index (UTI) |
| --- | --- | --- | --- | --- |
| Merey Crude | 1779 | PG64-22 | 64.4–25.2 | 89.6 |
| MC + 11% UMO bottoms | 1618 | PG58-22 | 63.1–24.2 | 87.3 |

The data show that adding used motor oil bottoms to neat asphalt has little effect (if any, when viscosity differences are considered) on the high temperature properties of the blend.

The dynamic shear measurement $DSR_{PAV}$ (which measures an asphalt's ability to withstand fatigue cracking at intermediate temperatures) was 23.4° C. for the Merey Crude vacuum bottoms and 20.9° C. for the Merey Crude/ UMO blend with every 3° C. drop in passing temperature translating into a 6° C. drop in low temperature performance grade. These data indicate that addition of UMO bottoms can improve fatigue cracking characteristics of the Merey Crude asphalt. Accordingly, it is believed that the used motor oil bottoms produced by the present invention are particularly useful as additives for asphalts having poor fatigue cracking properties, i.e., the used motor oil bottoms fraction can be subsequently added to asphalt in amounts sufficient to improve fatigue cracking at intermediate temperatures by lowering dynamic shear measurement $DSR_{PAV}$ passing temperature of the resulting blend. The bottoms fraction can be present in an amount sufficient to improve fatigue cracking and/or thermal cracking characteristics by lowering passing temperatures of dynamic shear rheometer AASHTO-TP5-93 and/or bending beam rheometer AASHTO-TP1-93.

Because the high temperature limit of asphalt binders displays a strong correlation to viscosity, it is believed that improved Performance Grade ratings can be obtained by raising the viscosity of the blend to, say, 1800 or 2000 poise.

The present invention further relates to a process for recovering lube oil base stocks from used lubricating oil formulations containing base oil stock and organo-metallic component which comprises:

i) directly contacting said used lubricating oil with a heated vapor selected from the group consisting of methane, ethane, propane, and steam, under temperature, contact times, and superficial velocity conditions sufficient to provide a desired volume of pumpable bottoms, and vaporizing and removing as an overhead comprising gases and distillatable hydrocarbons at least 35 vol. %, preferably at least 50 vol. % of said used lubricating oil charged to the process;

ii) condensing said overhead in at least one stage;

iii) recovering at least part of said overhead as distillate; and iv) recovering a bottoms fraction containing organo-metallic compound decomposition products.

We claim:

1. A process for recovering lube oil base stocks from used lubricating oil formulations containing base oil stock and organo-metallic component which comprises:

i) directly contacting said used lubricating oil with a heated vapor selected from the group consisting of methane, ethane, propane, and steam, under temperature, contact times, and superficial velocity conditions sufficient to at least partially decompose said organo-metallic component and provide a desired volume of pumpable bottoms, and vaporized overhead comprising gases and distillatable hydrocarbons, with no substantial carryover of metals into the overhead;

ii) condensing said overhead in at least one stage;

iii) recovering at least part of said overhead as distillate; and iv) recovering a bottoms fraction containing organo-metallic compound decomposition products.

2. The process of claim 1 wherein said contacting is carried out in a vessel charged with said used lubricating oil.

3. The process of claim 2 which further comprises v) charging at least one additional vessel with said used lubricating oil before, during, and/or after said step i) to provide an additional source of overhead to said condensing step ii).

4. The process of claim 3 wherein at least two additional vessels are used thereby providing an essentially continuous flow of overhead to step ii).

5. The process of claim 1 which is carried out in the absence of process fouling.

6. The process of claim 2 wherein said heated vapor is introduced in the vessel at temperatures ranging from 450 to 1800° F., a vapor rate of 0.1 to 10 pounds heated vapor per pound of charge, and a superficial velocity of no greater than 5.5 feet per second, to provide vaporization temperatures in the vessel ranging from 400 to 1000° F., and said used lubricating oil is contacted with the heated vapor for a period ranging from 0.1 to 2 hours.

7. The process of claim 6 wherein said vaporization temperatures, vapor rate, superficial velocity, and contact times are adjusted to provide a volume reduction of the total amount of used lubricating oil added to the vessel ranging from 20 to 95 wt. %.

8. The process of claim 2 wherein said heated vapor is steam which is introduced in the vessel at temperatures ranging from 700 to 1100° F., at a steam rate of 2 to 3 pounds per pound charge, and a superficial velocity of no greater than 3 feet per second to provide vaporization temperatures in the vessel ranging from 550 to 650° F., and said used lubricating oil is contacted with the steam for a period ranging from 0.25 to 0.5 hours.

9. The process of claim 2 wherein said heated vapor is recovered from the overhead and recycled to said vessel.

10. The process of claim 1 wherein said used lubricating oil is raw used lubricating oil which contains water and light ends having a boiling point of less than 210° F.

11. A process for recovering lube oil base stocks from used lubricating oil formulations containing base oil stock and organo-metallic component which comprises:

i) directly contacting said used lubricating oil with a heated vapor selected from the group consisting of methane, ethane, propane, and steam, under temperature, contact times, and superficial velocity conditions sufficient to provide a desired volume of pumpable bottoms, and vaporizing and removing as an overhead comprising gases and distillatable hydrocarbons at least 35 vol. % of said used lubricating oil charged to said process;

ii) condensing said overhead in at least one stage;

iii) recovering at least part of said overhead as distillate; and iv) recovering a bottoms fraction containing organo-metallic compound decomposition products.

12. The process of claim 11 wherein at least 50 wt. % of said used lubricating oil charged to said process is vaporized and removed as an overhead.

* * * * *